UNITED STATES PATENT OFFICE 2,657,194

LINEAR POLYESTERS FROM STILBENE DICARBOXYLIC ACIDS

Judson C. Butler, Concord, and Douglas C. McGowan, Richmond, Calif., assignors to California Research Corporation, San Francisco, Calif., a corporation of Delaware No Drawing. Application March 25, 1950, Serial No. 151,984

16 Claims. (Cl. 260—75)

This invention relates to novel linear polymers and more particularly to highly polymeric derivatives of stilbene dicarboxylic acid and polyoxyalkylene glycols having valuable and unusual properties.

Linear polymers prepared using a dibasic acid and glycols are known. Such linear polymers vary in character depending on the particular dibasic acid and glycol used in their preparation, but without exception they are devoid of optical characteristics, such as fluorescence, whereby the general appearance of filament fibers and materials produced from them is greatly improved. In addition, these linear polymers known to the prior art are ordinarily poor in dyeing qualities since they are low in reactivity and are not receptive to dyestuffs of the usual types. Furthermore, all such linear polymers including even those of diaryl type structures are characterized generally by their lack of rigidity in the molecule and thus possess lower melting points which render them more susceptible to deformation by heat.

One object of our invention is to provide new and useful linear fiber-forming polymers having valuable properties including optical characteristics such as fluorescence. Another object is the preparation of linear polymers having improved reactivity such as receptivity for dyes. Still another object of our invention is the provision of linear polymers characterized by their molecular rigidity and the attendant improved properties including higher melting points. A still further object of our invention is to provide a method of preparing new and useful linear polymers from stilbene dicarboxylic acid compounds. Other objects of our invention will appear hereinafter.

We have found that linear fiber-forming polymers possessing fluorescence, improved reactivity including higher receptivity for dyes, and higher melting points can be obtained by reacting together a stilbene dicarboxylic acid compound and at least one member of the group of polyoxyalkylene glycols having the formula H—(—O—R—)$_n$—OH where R is an alkylene radical of from about 2 to 6 carbon atoms and n is an integer of from about 2 to 5. A dibasic acid compound other than the stilbene dicarboxylic acid compound can also be used in the reaction along with the stilbene dicarboxylic acid compound according to our invention to produce a mixed acid type fiber-forming linear polymer derivative.

The new and useful fiber-forming linear polymers according to our invention are highly polymeric derivatives of stilbene dicarboxylic acid compounds and polyoxyalkylene glycols characterized by recurring units of the general formula

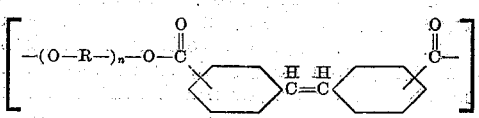

where R is an alkylene radical of from about 2 to 6 carbon atoms and n is an integer of from about 2 to 5.

The stilbene dicarboxylic acid compounds used in our invention are unique in having a trifunctional character consisting of two carboxyl groups and an olefinic double bond. When the carboxyl groups are utilized as in the case of a polyester, the remaining double bond may be used to alter the character of the molecule. Similar alterations of the double bond may also be carried out before the formation of the polyester. Various compounds capable of adding to the double bond may be utilized depending on the product desired. For instance, bromine or other halogens may be added across the bond. Hydrogen peroxide or potassium permanganate can hydroxylate it. Hydrogen halides, hypohalites, and organic acids will add across it. Maleic anhydride may undergo a reaction with it. Numerous other reactants capable of adding to the double bond are known to the art and are also contemplated. Products such as those formed by the above reactions will change the nature of the stilbene dicarboxylic acid compound or the polyester derivative very markedly and may be used per se or reacted further as new activation centers to produce additional alterations in the character of the material. Resultant alterations in properties include improved susceptibility of the polymer derivative to dyeing due to the incorporation of reactive centers, polar groupings or chromophors etc., actual reaction with dyes to form colored polymers, the production of thermosetting polymers by crosslinking through the new groups, changes in solubility, melting point and chemical stability of the monomer and polymeric derivatives and "drying" of polymers by uptake of oxygen through the double bond.

The stilbene dicarboxylic acid compounds may be any of the ester-forming derivatives of stilbene dicarboxylic acid as well as the acid per se. Different isomers of stilbene dicarboxylic acid may be used such as the ortho-ortho', metameta', para-para', ortho-meta', ortho-para' etc.

But the para-para' isomers hereinafter referred to as the "pp' stilbene dicarboxylic acid compounds" are preferred. Suitable ester-forming derivatives, as for example the esters, half-esters, acid chlorides etc., may be used. They may be aliphatic, cycloaliphatic, aromatic, or alkylaromatic esters of the stilbene dicarboxylic acids, for instance, alkyl esters such as methyl, ethyl, propyl, butyl, amyl, hexyl, heptyl and octyl stilbene dicarboxylates or cycloaliphatic, aryl and alkaryl esters derived from cyclopropyl carbinol, cyclobutanol, cyclopentanol, cyclohexanol, phenol, cresols, benzyl alcohol, and the like. The diethyl ester of pp' stilbene dicarboxylic acid is generally utilized as it is readily prepared and possesses most of the desirable physical characteristics.

The glycols or their mixtures of two or more which are reacted with the pp' stilbene dicarboxylic acid compound according to this invention may be any of the polyoxyalkylene glycols known to the art having alkylene radicals of from about 2 to 6 carbon atoms and containing from about 2 to 5 recurring oxyalkylene units. Examples of suitable polyoxyalkylene glycols are diethylene glycol, triethylene glycol, tetraethylene glycol, pentaethylene glycol, the dimer, trimer etc. of 1,3-propylene glycol, or of 1,4-butylene glycol etc. However, for this invention diethylene glycol and triethylene glycol are generally preferred for their availability and for the desirable physical characteristics of the products derived from them.

Dibasic acid compounds other than the stilbene dicarboxylic acid compounds which can be mixed with the stilbene dicarboxylic acid compounds in this invention may be any of the organic acids characterized by the presence of two carboxyl groups. They may be aliphatic, unsaturated aliphatic, cycloaliphatic, or aromatic. Illustrative of suitable aliphatic acids are succinic acid, adipic acid, suberic acid etc. Unsaturated aliphatic acids which may be used are fumaric acid, maleic acid etc. Cycloaliphatic dicarboxylic acid such as cyclopentane dicarboxylic acid, cyclohexane dicarboxylic acid etc. are also suitable. Dicarboxylic aromatic acids which are suitable are illustrated by terephthalic acid and bibenzyl dicarboxylic acid, with terephthalic acid being preferred in this invention.

The broad class of polyester fiber-forming linear polymers from stilbene dicarboxylic acid and polyoxyalkylene glycols according to this invention are, briefly stated, prepared by heating a mixture comprising the stilbene dicarboxylic acid compound with an excess of the particular polyoxyalkylene glycol. The general reaction is usually carried out at atmospheric pressure, although subatmospheric or superatmospheric pressures may be utilized when such conditions appear desirable because of unusual physical characteristics of the reactants such as extremely low boiling points etc. Agitation is conveniently obtained by bubbling a stream of nitrogen or other inert gas slowly through the reaction mixture, although other means such as mechanical stirrers etc. are also suitable. Inert atmospheres are preferred. The reaction ordinarily requires a period of from about 5 to 20 hours at temperatures of from about 200° C. to 350° C. and preferably from 280° C. to 300° C. Other temperatures and heating periods sufficient to produce a linear polymer, the filaments of which are suitable for cold drawing, will depend on the particular reactants used and can be determined readily through common testing procedures.

More particularly, the fiber-forming linear polyesters of our invention are suitably prepared by heating dimethyl or diethyl stilbene dicarboxylic acid ester, and another dibasic acid ethyl or methyl ester if a mixed acid-type of linear polymer is desired, with an excess of the polyoxyalkylene glycol to be used. A small amount of an ester interchange catalyst, for example, 0.025 to 1% based on the total ester, may be added if desired and the mixture then heated at atmospheric pressure with gentle nitrogen bubbling until the methanol or ethanol used in esterifying the stilbene dicarboxylic acid and the other dibasic acid is present is evolved from the reaction mixture along with some of the excess unreacted polyoxyalkylene glycol if it is sufficiently low boiling. A vacuum may then be applied and the remainder of the excess polyoxyalkylene glycol drawn off. This process ordinarily requires from about 6 to 16 hours and is usually carried out at a temperature of about 280–300° C. The product may then be heated further if necessary to melt it and filaments are formed by extruding under pressure.

Two distinct reactions are involved in the above process of polymerization. The first reaction is the esterification or ester interchange of the stilbene dicarboxylic acid or its diester with the polyoxyalkylene glycol and the resultant formation of the corresponding glycol ester. The second reaction involves the formation of the linear polyester from the simple polyoxyalkylene glycol esters of stilbene dicarboxylic acid and is continued until a reaction product is obtained from which filaments can be formed that are suitable for cold drawing. The polyoxyalkylene glycol used in the formation of these linear polyesters is ordinarily present in an excess with as high as 10–20 mols of glycol per mol of stilbene dicarboxylic acid compound being used preferably. Esterifying catalysts such as hydrogen chloride or paratoluene sulfonic acid may be used to speed up the esterification reaction if stilbene dicarboxylic acid or any of the other dibasic acids disclosed for the production of mixed acid polyesters per se are used in the reaction. The ester interchange reaction also can be advantageously promoted by the use of ester interchange catalysts such as lithium, sodium, magnesium etc. in the form of powder, chips, shavings, and the like.

When mixed acid polyesters are prepared according to this invention the stilbene dicarboxylic acid compound and the other dibasic acid compound reacted with the polyoxyalkylene glycol may be used in any desired proportions. Quantities as low as 1% of the stilbene dicarboxylic acid compound impart a definite fluorescent property to the products. Larger proportions of the stilbene dicarboxylic acid product up to 100% of the acid compounds used give increasing fluorescence. Various proportions of the stilbene dicarboxylic acid compound up to 100% of the acid compounds used may be used in the mixed acid polyesters to modify the melting point characteristic of the other dibasic acid polyesters. The particular proportions necessary to raise or lower the melting points of the products to any desired point are easily determined by workers in the art using known methods of testing.

The following examples serve to illustrate the preparation of linear polymers in accordance with our invention. These examples are to be regarded solely as illustrative and not as restricting the scope of the invention.

*Example 1.*—The diethyl ester of pp' stilbene dicarboxylic acid was prepared as follows:

100 g. of pp' stilbene dicarboxylic acid and 400 g. of thionyl chloride (sulfurous oxychloride) were refluxed in a flask for 24 hours with occasional agitation by shaking. The mixture was then cooled to room temperature and 200 ml. of chloroform were added followed by 200 ml. of absolute ethanol added dropwise. The addition of the ethanol was accompanied by a vigorous evolution of gas. After addition of ethanol the mixture was refluxed for about 4 hours and allowed to stand over night after which the solution was decanted into a beaker. The crystals remaining in the flask were transferred to the beaker by dissolving in hot chloroform. The material in the beaker was then evaporated to near dryness, taken up with 2 liters of chloroform heated to boiling, and filtered. The filtrate was concentrated on a steam hot plate and then dried at 90° C. under 5 mm. pressure for 7–8 hours to yield 122.2 g. of crystals (121.0 g. theoretical). The product was recrystallized from ethylene dichloride alcohol mixture and washed with alcohol.

| Inspections | Found | Theory or Reported for Diethyl Ester |
|---|---|---|
| Melting Point _____°C__ | 130–131.5 | 130–131 |
| Saponification No_____ | 160, 162 | 162.2 |
| Acid No_____ | Trace | 0 |

*Example 2.*—The diethyl ester of pp' stilbene dicarboxylic acid described in the preceding example was reacted with triethylene glycol, as follows:

32.4 g. of the diethyl ester was placed in a flask with 50 ml. of triethylene glycol and a small piece of sodium and a few magnesium turnings. The mixture was heated slowly while stirring until the diethyl ester was completely dissolved. The ingredients were then heated to about 280° C. and maintained at that temperature for several hours with agitation, ethyl alcohol being taken off as it was formed. The pressure on the reaction flask was then gradually reduced to about 10 mm. while the heating was continued and the excess triethylene glycol distilled off.

The product was very viscous and rubbery at temperatures as high as 310° C. It could be pulled into tough sheets and fibers which were capable of being oriented by cold drawing. The product on exposure to ultraviolet light, was fluorescent. It was found to be heat stable and showed no decomposition at temperatures as high as 350° C. When pressed at elevated temperatures between metal sheets and allowed to cool it formed a strong bond to the metal.

*Example 3.*—Linear polyesters of terephthalic acid and triethylene glycol were prepared as follows, in order that a comparison of another aromatic acid-triethylene glycol ester might be made with the above product.

20.0 g. of dimethyl terephthalic acid was placed in a flask with about 50 ml. of triethylene glycol, a few magnesium turnings and a small piece of sodium. As in the preceding example, the mixture was heated and evacuated to produce the linear polymer. The product, upon heating, was observed to become thicker, but suddenly at about 300° C. it proceeded to give off gas and began to decompose, thereby indicating its instability at such temperatures. Although the product possessed a very low viscosity at around 300° C., it formed a plastic solid at room temperature which was tested and found to possess only negligible tensile strength, incapable of measurement. This product, when exposed to ultraviolet illumination, failed to display any fluorescent characteristics.

From the foregoing illustrations and examples of this invention it will be apparent that we have developed new and useful linear polyesters of stilbene dicarboxylic acid and polyoxyalkylene glycols which possess remarkable and valuable properties. Among these valuable properties which have been expressly discussed and illustrated is their fluorescence. Another valuable property which has also been noted is the ability of the linear polyesters to modify the melting point of other known linear polymers. Still another advantage is the presence in the resulting molecule of a carbon-to-carbon double bond which can be used for making derivatives and various adducts of the polymer if desired. A further advantage of polymers such as ours is their improved dye receptivity. Due to the presence of the double bond, cross-linking by known means such as vulcanization or treating with sulfur, oxygen and the like, may be effected with the polymers. These properties of our linear polyesters as well as other properties which are inherent in them render them very useful in many applications for which linear polymers of a similar type have heretofore been utilized.

The linear polyesters of this invention are especially useful in the preparation of yarns and fabrics because of their fiber-forming characteristics. They can also be utilized in other applications generally associated with linear polymers of this type such as coatings, molding compositions, films, bristles, adhesives etc.

The linear polyesters may be used for these and other purposes alone or in conjunction with other linear polymers of the polyester, polyamide, polyester amide etc. type. They may also be utilized with other modifying agents such as plasticizers, natural or synthetic resins, antioxidants, pigments, dyes and lustrants, as well as other known additives.

Although our invention has been described in terms of its specific embodiments, certain modifications and equivalents will be apparent to those skilled in the art. We intend such variations to be included within the present invention which is to be limited only by the reasonable scope of the appended claims.

We claim:

1. A fiber-forming linear polymer which comprises the heat reaction product of reactants comprising (a) a stilbene dicarboxylic acid compound of the group consisting of its acids, esters and acid chlorides and (b) at least one bifunctional compound of the group consisting of polyoxyalkylene glycols having the formula

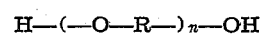

where R is an alkylene radical of from about 2 to 6 carbon atoms and $n$ is an integer of from about 2 to 5.

2. A fiber-forming linear polyester characterized by recurring units of the general formula

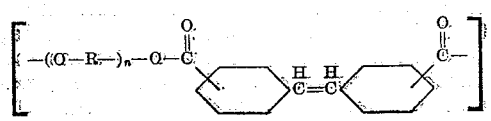

where R is an alkylene radical of from about 2 to 6 carbon atoms and n is an integer of from about 2 to 5.

3. A fiber-forming linear polyester which comprises the heat reaction product of reactants comprising (a) a stilbene dicarboxylic acid compound of the group consisting of its acids, esters and acid chlorides and (b) at least one bifunctional aliphatic compound of the group consisting of polyoxyalkylene glycol having the formula

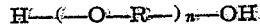

where R is an alkylene radical of from about 2 to 6 carbon atoms and n is an integer of from about 2 to 5 and (c) a dibasic organic acid other than a stilbene dicarboxylic acid characterized by the presence of two carboxyl groups.

4. A mixed fiber-forming linear polyester which comprises the heat reaction product of reactants comprising (a) a member of the group consisting of stilbene dicarboxylic acid, its esters and its acid chlorides, (b) a polyoxyalkylene glycol of the formula

where R is an alkylene radical of from about 2 to 6 carbon atoms and n is an integer of from about 2 to 5, and (c) a member of the group consisting of terephthalic acid and its esters.

5. A fiber-forming linear polyester which comprises the heat reaction product of reactants comprising (a) a member of the group consisting of stilbene dicarboxylic acid, its esters and its acid chlorides, and (b) triethylene glycol.

6. A mixed acid fiber-forming linear polyester which comprises the heat reaction product of reactants comprising (a) a member of the group consisting of stilbene dicarboxylic acid, its esters and its acid chlorides, (b) triethylene glycol and (c) a member of the group consisting of terephthalic acid and its esters.

7. A mixed glycol fiber-forming linear polyester which comprises the heat reaction product of reactants comprising (a) a member of the group consisting of stilbene dicarboxylic acid, its esters and its acid chlorides and (b) a mixture of at least two different polyoxyalkylene glycols of the formula

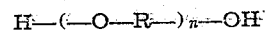

where R is an alkylene radical of from about 2 to 6 carbon atoms and n is an integer of from about 2 to 5.

8. A fiber-forming linear polyester which comprises the heat reaction product of reactants comprising the diethyl ester of pp' stilbene dicarboxylic acid and triethylene glycol.

9. A fiber-forming linear polyester characterized by recurring units of the formula

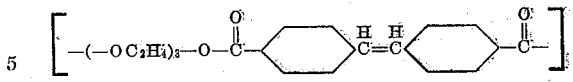

10. Polymeric triethylene glycol stilbene dicarboxylate.

11. Polymeric triethylene glycol pp' stilbene dicarboxylate.

12. Copolymeric triethylene glycol pp' stilbene dicarboxylate-terephthalate.

13. A method of preparing a fiber-forming linear polyester which comprises reacting a mixture comprising (a) a stilbene dicarboxylic acid compound of the group consisting of its acids, esters and acid chlorides and (b) at least one bifunctional aliphatic compound of the group consisting of polyoxyalkylene glycols having the formula

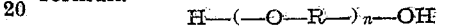

where R is an alkylene radical of from about 2 to 6 carbon atoms and n is an integer of from about 2 to 5.

14. A method of preparing a fiber-forming linear polyester which comprises heating until thickened a mixture comprising (a) a member of the group consisting of stilbene dicarboxylic acid, its esters and its acid chlorides and (b) a polyoxyalkylene glycol of the formula

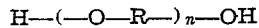

where R is an alkylene radical of from about 2 to 6 carbon atoms and n is an integer of from about 2 to 5.

15. A method of preparing a mixed acid fiber-forming linear polyester which comprises heating until thickened a mixture comprising (a) a stilbene dicarboxylic acid compound selected from the group consisting of its acids, esters and acid chlorides, (b) a polyoxyalkylene glycol having the formula

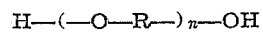

where R is an alkylene radical of from about 2 to 6 carbon atoms and n is an integer of from about 2 to 5, and (c) a member of the group consisting of terephthalic acid and its esters.

16. A method of preparing a fiber-forming linear polyester which comprises heating until thickened a mixture comprising the diethyl ester of pp' stilbene dicarboxylic acid and triethylene glycol.

JUDSON C. BUTLER.
DOUGLAS C. McGOWAN.

References Cited in the file of this patent

UNITED STATES PATENTS

| Number | Name | Date |
|---|---|---|
| 2,388,318 | Frosch | Nov. 6, 1945 |

FOREIGN PATENTS

| Number | Country | Date |
|---|---|---|
| 588,497 | Great Britain | May 22, 1947 |
| 621,102 | Great Britain | Apr. 4, 1949 |